4/8/86 OR 4,581,516

United States Patent [19]

Hatch et al.

[11] Patent Number: 4,581,516

[45] Date of Patent: Apr. 8, 1986

[54] PLASMA TORCH WITH A COMMON GAS SOURCE FOR THE PLASMA AND FOR THE SECONDARY GAS FLOWS

[75] Inventors: Bruce O. Hatch, Lebanon; Richard A. Spaulding, Hanover, both of N.H.

[73] Assignee: Thermal Dynamics Corporation, West Lebanon, N.H.

[21] Appl. No.: 515,913

[22] Filed: Jul. 20, 1983

[51] Int. Cl.[4] .......... B23K 9/00

[52] U.S. Cl. .......... 219/121 PM; 219/121 PP; 219/121 PQ; 219/75

[58] Field of Search ..... 219/121 P, 121 PM, 121 PA, 219/121 PN, 121 PP, 121 PQ, 121 PR, 76.16, 75, 74; 313/231.3-231.5; 315/111.21

[56] References Cited

U.S. PATENT DOCUMENTS

| | | | |
|---|---|---|---|
| 3,597,649 | 2/1969 | Bykhovsky et al. . | |
| 3,813,510 | 5/1974 | Hatch . | |
| 4,024,373 | 5/1977 | Bykhovsky et al. | 219/121 PN |
| 4,101,751 | 7/1978 | Urbanic et al. | 219/121 PQ |
| 4,295,030 | 10/1981 | Hosoda et al. . | |
| 4,321,454 | 3/1982 | Willems et al. | 219/121 PQ |
| 4,324,971 | 4/1982 | Frappier | 219/121 PV |
| 4,421,970 | 12/1983 | Couch, Jr. | 219/121 PV |

FOREIGN PATENT DOCUMENTS

| | | |
|---|---|---|
| 2534106 | 4/1984 | France . |
| 2534107 | 4/1984 | France . |
| 52-34732 | 3/1977 | Japan . |
| 52-34731 | 3/1977 | Japan . |

OTHER PUBLICATIONS

"WEL-PEN" by Nihon Welding Co. Ltd. of Japan sales literature.

Manual for Operating Instructions for Plasma (melt-)-Cutting Apparatus.

"Plasma Cutting Unit PA 100-2", a brochure of Welding and Cutting Equipment from Finsterwalde.

*Primary Examiner*—M. H. Paschall

*Attorney, Agent, or Firm*—Majestic, Gallagher, Parsons & Siebert

[57] ABSTRACT

In the plasma arc torch of this invention the same gas may be used for generating a plasma and for secondary gas flow for cooling the torch and the workpiece. A torch housing defines a chamber which has an outlet at the end of the housing. The torch also includes an electrode in the chamber near the outlet and means in the chamber for separating the gas flowing towards the outlet of the housing into a primary gas flow adjacent to the electrode for generating a plasma and a secondary gas flow away from the electrode for cooling the torch and the workpiece. In the preferred embodiment, air may be used for both the plasma forming gas and the secondary gas and the electrode has a halfnium insert. The torch has a torch tip adjacent to the electrode and the torch may be started without a pilot arc by touching the workpiece with the torch tip. No standoff between the electrode and the workpiece needs to be maintained and the torch operator simply drags the torch tip on the workpiece resulting in a more accurate cut or weld.

13 Claims, 5 Drawing Figures

PLASMA TORCH WITH A COMMON GAS SOURCE FOR THE PLASMA AND FOR THE SECONDARY GAS FLOWS

BACKGROUND OF THE INVENTION

This invention is related generally to plasma torches which are generally used for cutting, welding and spray bonding and to an overall improved design for such torches.

Plasma torches, also known as electric arc torches, are commonly used for cutting, welding and spray bonding of workpieces and operate by directing a plasma consisting of ionized gas particles toward the workpiece. In the operation of a typical plasma torch, such as illustrated in U.S. Pat. Nos. 4,324,971, 4,170,727 and 3,813,510, assigned to the same assignee as the present invention. A gas to be ionized is supplied to the front end of the torch in front of a negatively-charged electrode. The welding tip which is adjacent to the end of the electrode at the front end of the torch has a sufficiently high voltage applied thereto to cause a spark to jump between the electrode and welding tip thereby heating the gas and causing it to ionize. A pilot DC voltage between the electrode and the welding tip maintains an arc known as the pilot or non-transferred arc. The ionized gas in the gap appears as a flame and extends externally from the tip. As the torch head or front end is brought down towards the workpiece, the arc jumps from the elctrode to the workpiece since the impednace of the workpiece current path is lower than the impedance of the welding tip current path.

In conventional torches, the negatively-charged electrode is typically made of copper with a tungsten insert and current flows between the tungsten insert and the torch tip or workpiece with the torch is operated. Tungsten is oxidized easily at high temperatures so that if the gas to be ionized is air, the tungsten insert becomes oxidized and is consumed rapidly. Therefore, the gas to be used for creating the plasma is typically an inert gas, such as nitrogen or argon.

Frequently, a secondary gas flow is also provided in conventional plasma torches for various different purposes. The most common purpose of a secondary gas flow immediatly adjacent and surrounding the electric arc is to cool the torch and the workpiece. In a cutting operation, cooling the workpiece will result in a straighter kerf and therefore a cleaner cut. In a welding operation, cooling the workpiece will result in a less deformed or more accurate weld caused by the flow of molten metal. In conventional plasma torches, two gas lines are provided: one for supplying the plasma forming gas and the other supplying gas for the secondary gas flow. If different gases are used for the plasma forming gas and the secondary gas, operation of the torch will require two gas supplies. Having to use gas lines is inconvenient to torch operators and using two gas supplies is expensive. Therefore, it is desirable to provide a plasma torch which requires only one gas line and only one gas supply.

SUMMARY OF THE INVENTION

The plasma arc torch of this invention includes a torch housing defining a chamber which has an outlet at the end of the housing and means for supplying a gas to the chamber, flowing towards the outlet. The gas so supplied is suitable for generating a plasma and for a secondary gas flow which will cool the torch and the workpiece. The torch also includes an electrode in a chamber near the outlet and means in the chamber for separating the gas flowing towards the outlet of the housing into a primary gas flow adjacent to the electrode for generating a plasma and a secondary gas flow away from the electrode for cooling the torch and the workpiece.

According to the present invention, air may be used for both the plasma-forming gas and the secondary gas if the electrode has a halfnium insert. According to the invention, the torch has a torch tip adjacent to the electrode and the torch may be started without a pilot arc by touching the workpiece with the tip. No standoff between the electrode and the workpiece needs to be maintained and the torch operator simply drags the torch tip on the workpiece, resulting in a more accurate cut.

DETAILED DESCRIPTION OF THE PREFERRED EMBODIMENT

Figure 1:
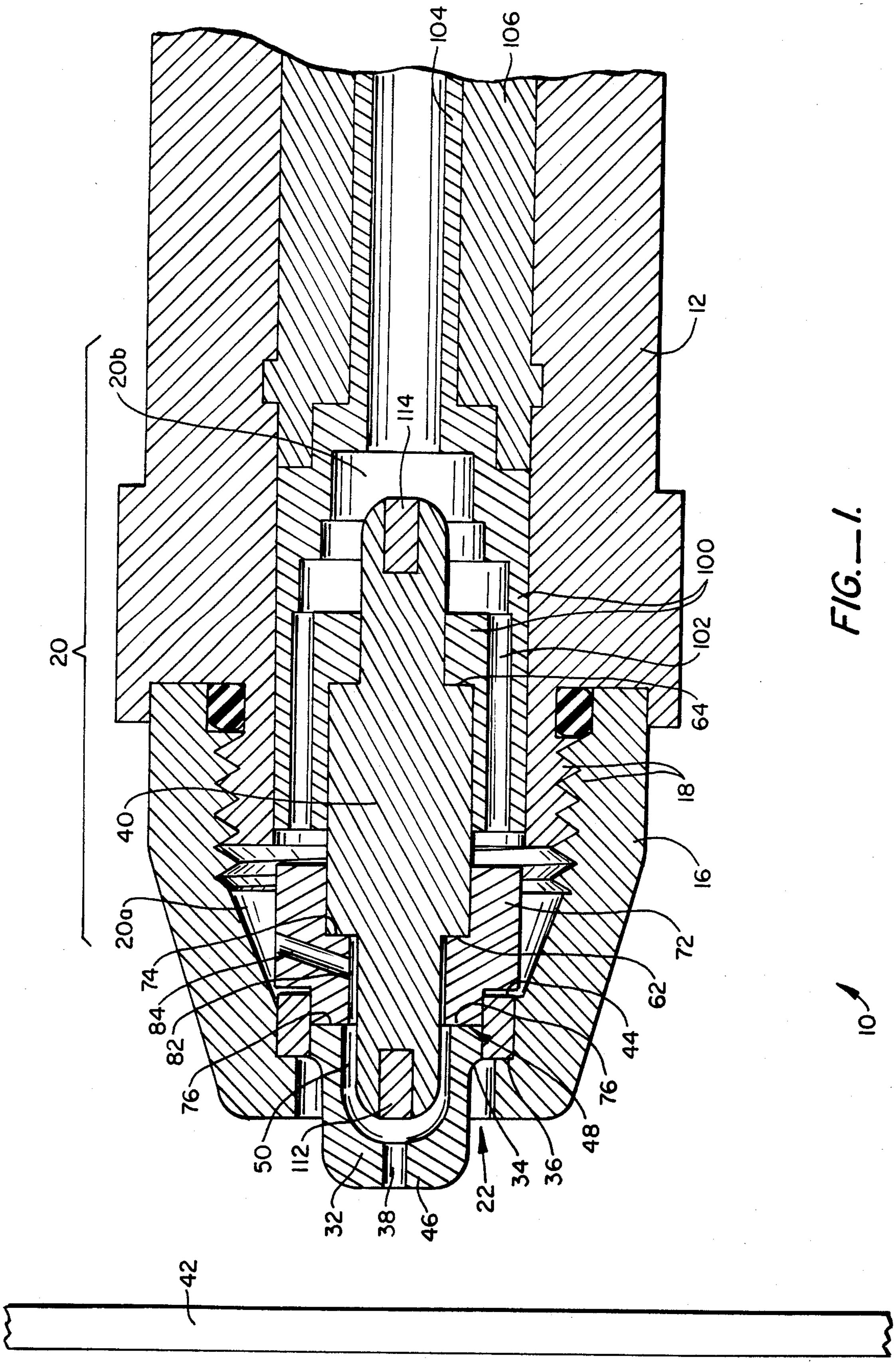
FIG. 1 is a cross-sectional view of the front part (torch head) of a plasma torch illustrating the preferred embodiment of this invention.

FIG. 1 is a cross-sectional view of the front portion, or torch head, illustrating the preferred embodiment of this invention. As shown in FIG. 1, the plasma torch 10 comprises a torch housing 12 and a cup 16. The cup and the housing may be connected by any conventional means so long as the connection is sturdy after connecting and that the two may be disconnected conveniently. In the preferred embodiment, the cup and housing are threaded in a complimentary manner so that the cup may be screwed onto the housing. Constructed in this manner, the cup portion may be disconnected so that the cathode and torch tip assembly described below may be assembled or disassembled conveniently. It will be understood that other shapes and manners of construction of housing 12 and cup 16 may be used and are within the scope of this invention.

As shown in FIG. 1, both the housing and cup are cylindrical defining a cylindrical chamber 20. The side of the cup away from the housing tapers and has an outlet 22 through which chamber 20 communicates with the outside. A cup-shaped torch tip 32 fits into the outlet 22 thereby closing the outlet except for some controlled openings in the torch tip. The cup-shaped torch tip has a rim 34 shaped to fit into shoulder 36 on the inside surface of the cup near outlet 22. The cup-shaped torch tip has a passageway 38 in its bottom 46 (bottom of the cup) for passage of the transferred arc between cathode 40 and workpiece 42. Rim 34 of the torch tip has slots 44 which allow passage of gas from chamber 20 towards the workpiece to form the secondary gas flow. Thus, when a gas supply (not shown) supplies a gas to chamber 20 flowing towards the outlet 22, the gas may escape through passage way 38 or slots 44 in the torch tip.

Figure 2:
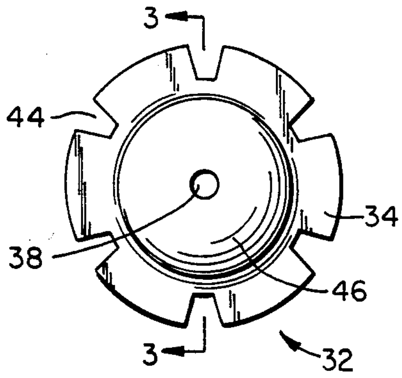
FIG. 2 is an elevational view of the torch tip of the preferred embodiment of this invention.
Figure 3:
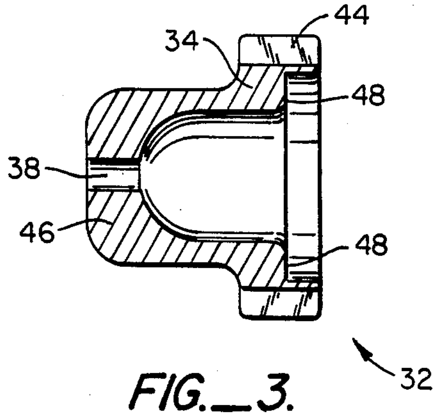
FIG. 3 is a cross-sectional view of the torch tip of FIG. 2 taken along the lines 3—3 of FIG. 2.

FIGS. 2 and 3 illustrate the construction of the torch tip in more detail. FIG. 2 is an elevational view of the cup-shaped torch tip from the bottom side of the cup. FIG. 3 is a cross-sectional view of the torch tip taken along the lines 3—3 in FIG. 2. As shown in FIGS. 2 and 3, the torch tip defines a flange shaped rim 34 with six evenly spaced slots 44. The torch tip defines a bottom portion 46 with passageway 38 therein as previously described. Rim 34 is recessed and has a shoulder 48 for connection with a gas distributor described below.

In reference to FIG. 1, the front end of cathode 40 has a portion which extends into the torch tip leaving an annular space 50 between it and the torch tip through which gas from chamber 20 may flow towards passageway 38. In the preferred embodiment, cathode 40 is cylindrical in shape and has a middle portion with a larger diameter than the two ends of the cathode which enables the cathode to be conveniently connected to the torch housing. The raised middle portion of the cathode defines two shoulders 62 and 64. A gas distributor 72 is connected between shoulder 48 of the torch tip and the front shoulder 62 of cathode 40. The gas distributor is annular in shape and surrounds cathode 40. The side of the gas distributor in contact with the cathode has a recess defining a shoulder 74 shown more clearly in reference to FIGS. 4 and 5. The raised middle portion of the cathode fits into this recess so that when the gas distributor is connected to the cathode, shoulder 74 of the gas distributor abuts shoulder 62 of the cathode. The gas distributor on the side opposite the shoulder 74 has a smaller outsider diameter so that it fits into the recess in the rim of the torch tip. When the torch tip and the gas distributor are connected, the annular side 76 of the gas distributor abuts annular shoulder 48 of the torch tip. The inside diameter of the gas distributor adjacent to surface 76 is slightly larger than the diameter of the front end of the cathode. Therefore, when the gas distributor is connected between the cathode and the torch tip, the gas distributor and the cathode defines in between a second annular chamber 82 which is in communication with the annular chamber 50 on one side but closed on the other.

Figure 4:
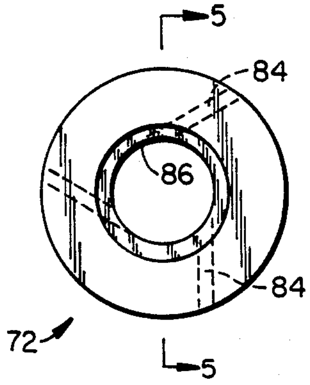
FIG. 4 is an elevational view of a gas distributor of a plasma torch illustrating the preferred embodiment of this invention.
Figure 5:
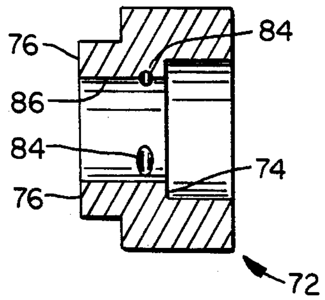
FIG. 5 is a cross-sectional view of the gas distributor of FIG. 4 taken along the lines 5—5 of FIG. 4.

FIGS. 4 and 5 illustrate the shape and construction of the gas distributor in more detail. FIG. 4 is an elevational view of the gas distributor from one end. FIG. 5 is a cross-sectional view of the gas distributor of FIG. 4 along lines 5—5 of FIG. 4. As shown in FIGS. 4 and 5, the gas distributor has a number of channels 84 tangential to the inside surface 86 of the gas distributor adjacent to the side 76. Thus, when the gas distributor is in the position as shown in FIG. 1, channels 84 will be tangential to the second annular chamber 82. When gas flows from chamber 20 through channels 84 towards annular chamber 82, a gas swirl will be created in chamber 82. This gas swirl continues into the annular chamber 50 to create a vortex at the tip of the front end of the cathode. This vortex will direct the transferred arc through passageway 38 towards workpiece 42.

As shown also in FIG. 1, the gas distributor does not block the secondary gas flow from chamber 20 through slots 44 of the torch tip towards the workpiece. In the center of chamber 20 is body 100 defining a hole in its center into which the cathode fits. When body 100 and cathode 40 are in the positions as shown in FIG. 1, they divide chamber 20 into a front portion 20*a* and a rear portion 20*b*. The body 100 further defines channels 102 around the cathode through which gas may pass between portions 20*a*, 20*b* of chamber 20. The ouside diameter of body 100 is such that it fits snugly into housing 14. The body 100 has a portion 104 in the shape of a tube which extends away from the cathode allowing the gas from the gas supply to flow therein. The space between the tube portion 104 and the housing is filled by a potting material 106 such as epoxy which glues the body 100 and its extension 104 to the housing. This will prevent slippage of the body.

When gas is supplied to tube 104, it will flow through the rear portion 20*b* of chamber 20, channels 102 to reach front portion 20*a* of chamber 20. There the gas flow is diverted into two flows: a primary flow through channesl 84 tangential to the second annular chamber 82 to create a vortex which would direct the transferred arc; and a secondary flow through slots 44 and then through the unblocked portion of outlet 22 between the torch tip and the front portion of the cup towards the workpiece for cooling the torch and the workpiece. If the plasma torch 10 is used for cutting the workpiece, the gas pressure supplied to chamber 20 should be high enough and slots 44 should be large enough to create a strong secondary flow for blowing away molten material from the cutting operation. The gas flow rates through channels 84 and slots 44 would depend on the relative cross-sectional areas of channels 84 to slots 44 and the gas pressure in chamber 20. Therefore, by selecting the appropriate ratio and gas pressure in chamber 20, the flow rates of the primary and secondary gas flows will be in predetermined ranges. The above described design for torch 10 renders it possible to use only one gas line and one gas supply to supply gas to chamber 20 so that the plasma torch of this invention is cheaper and more convenient for torch operators to use.

Cathode 40 has in each of its two ends a halfnium insert 112 and 114 respectively. The two inserts as well as the front and back ends of the cathode are substantially identical, so that when insert 112 is consumed, flipping over the cathode to replace the front end with the back end with insert 114 will enable the torch to operate as before. Insert 114 therefore is a spare ready for use when insert 112 has been consumed. Unlike tungsten, halfnium is resistant to oxidation, even at high temperatures. Therefore, air may be used as the plasma forming gas forming a vortex near the insert 112. Therefore, torch 10 may be operated using compressed air to supply both the primary and secondary flows and its operation will be less expensive.

The above description of method and construction used is merely illustrative thereof and various changes in shapes and sizes, materials or other details of the method and construction may be within the scope of the appended claims.

What is claimed is:

1. A plasma arc torch for cutting a workpiece comprising:

a torch housing defining a chamber which has an outlet at an end of the housing;

means for supplying a gas to the chamber flowing towards said outlet, said gas being suitable for generating a plasma and for a secondary gas flow which will cool the torch and the workpiece;

an electrode in the chamber near the outlet; and means in the chamber for separating said gas flowing towards the outlet of the housing into a primary gas flow adjacent to the electrode for generating a plasma and a secondary gas flow away from the electrode for cooling the torch and the workpiece, said primary and secondary gas flows being distinctly different gas flows that issue from the outlet at two locations spaced apart from each other.

2. The plasma arc torch of claim 1, wherein said secondary gas flow generated is strong enough to blow away molten material from the cutting operation.

3. The plasma arc torch of claim 1, wherein said electrode is elongated with one end facing the outlet and wherein said gas separating means comprises:

a cup-shaped torch tip having a rim in the shape of an annular flange which is shaped to fit into the outlet of the torch housing thereby closing said outlet, wherein said torch tip surrounds said end of the electrode and defines a first annular chamber between it and the electrode for passage of the primary gas flow, said tip further defining a passageway in the bottom of the cup-shaped tip for passage of a transferred arc and slots in its rim for passage of gas from the housing chamber towards the workpiece to form the secondary gas flow, said passageway and said slots being spaced apart thereby causing the primary and secondary gas flows to issue at spaced apart locations; and an annular gas distributor surrounding the electrode, said distributor being so shaped and so connected to the torch tip and electrode that it defines a second annular chamber between it and the electrode in communication with the first annular chamber at one end and closed at the other end, said distributor further defining therein a plurality of channels substantially tangential to the second annular chamber and connecting the housing chamber to the second annular chamber so that gas from the gas supplying means will travel from the chamber to the second and first annular chambers through said channels forming a primary gas flow and generating a vortex at said end of the electrode for directing the transferred arc from said end of the electrode to the workpiece through the passageway.

4. The plasma arc torch of claim 3, wherein the pressure of gas supplied by the gas supplying means and the proportion of the total cross-sectional area of the slots in the rim of the torch tip to the total cross-sectional area of the channels in the distributor are selected such that the strengths of the primary and secondary gas flows are within predetermined ranges.

5. A plasma arc torch for cutting a workpiece, comprising:

a torch housing defining a chamber which has an outlet at an end of the housing;

means for supplying air to the chamber flowing towards said outlet;

an electrode centered in the chamber near said outlet, said electrode having a halfnium insert facing the outlet of the housing, thereby enabling air to be used for a plasma forming gas without said electrode being consumed rapidly;

power supply for supplying suitable voltages and currents between the halfnium insert in the electrode and the workpiece to initiate and maintain a transferred arc there between through the outlet when said insert and workpiece are in close proximity; and means in the chamber for separating the air flowing in the chamber into a primary flow adjacent to the electrode for generating a plasma and a secondary flow away from the electrode for cooling the torch and the workpiece, said primary and secondary gas flows being distinctly different gas flows that issue from the outlet at two locations spaced apart from each other.

6. The torch of claim 5, wherein the electrode is elongated and has two ends, wherein the halfnium insert is located at one of the ends and wherein the electrode has a second spare halfnium insert at the other end, the two ends of the electrode and the two halfnium inserts being substantially identical so that when the insert at one end is consumed, flipping over the electrode with the other end facing the outlet will allow the torch to start and maintain a transferred arc between the halfnium insert at such other end and the workpiece for performing operations on the workpiece.

7. The plasma are torch of claim 5, wherein said secondary air flow is strong enough to blow away molten material from the cutting operation.

8. The plasma arc torch of claim 5, wherein said electrode is elongated, wherein said halfnium insert is at an end of the electrode facing the outlet, and wherein said gas separating means comprises:

a cup-shaped torch tip having a rim in the shape of an annular flange which is shaped to fit into the outlet thereby closing the outlet, wherein said torch tip surrounds said end of the electrode and defines a first annular chamber between it and the electrode for passage of the primary air flow, said tip further defining a passageway at the bottom of the cup-shaped tip for passage of a transferred arc and slots in its rim for passage of air from the housing chamber to the workpiece to form the secondary air flow; and an annular gas distributor surrounding the electrode, said distributor shaped and connected to the torch tip and the electrode in such manner so as to define a second annular chamber between it and the electrode that is in communication at one end with the first annular chamber and closed at the other end, said distributor further defining therein a plurality of channels that allow passage of air from the housing chamber to the second annular chamber and then to the first annular chamber, said channels beign tangential to the second annular chamber so that the air passing therethrough will generate a vortex at the halfnium insert for directing the transferred arc from the insert to the workpiece through the passageway.

9. The plasma arc torch of claim 8, wherein the pressure of air supplied by the air supply means and the proportion of the total cross-sectional area of the slots in the rim of the torch tip to the total cross-sectional area of the channels in the distributor are selected such that the strengths of the primary and secondary air flows are within predetermined ranges.

10. An electrode-torch tip assembly for a plasma arc torch, said torch including means for supplying gas to generate a primary and secondary gas flow, said assembly comprising:

a torch housing defining a housing chamber which has an outlet at an end of the chamber wherein gas supplied by the gas supplying means flows towards said outlet;

an elongated electrode centered in the housing chamber with an end facing said outlet;

a cup-shaped torch tip having a rim in the shape of an annular flange shaped to fit into said outlet thereby closing said outlet, wherein said torch tip surrounds said end of the electrode and defines a first annular chamber between it and the electrode, said cup-shaped tip further defining a passageway at its bottom for passage of a transferred arc and slots in its rim for passage of gas from the housing chamber towards a workpiece forming a secondary gas flow; said passageway and said slots being spaced apart thereby causing the primary and secondary gas flows to issue at spaced apart locations from said outlet; and an annular gas distributor surrounding the electrode, said distributor so shaped and connected to the torch tip and electrode that it defines a second annular chamber between it and the electrode in communication with the first annular chamber at one end and closed at the other end, said distributor further defining therein a plurality of channels connecting the housing chamber to the second annular chamber so that gas from the gas supplying means will flow from the housing chamber to the second annular chamber and then to the first annular chamber forming the primary gas flow, said channels being tangential to the second annular chamber so that the gas passing there through will generate a vortex at said end of the electrode for directing a transferred arc from said end to the workpiece through the passageway.

11. The plasma arc torch of claim 1, wherein said electrode is elongated with one end facing the outlet and wherein said gas separating means comprises:

a cup-shaped torch tip having a rim in the shape of an annular flange which is shaped to fit into the outlet of the torch housing thereby closing said outlet, wherein said torch tip surrounds said end of the electrode and defines a first annular chamber between it and the electrode for passage of the primary gas flow, said tip further defining a passageway in the bottom of the cup-shaped tip for passage of a transferred arc and slots in its rim for passage of gas from the housing chamber towards the workpiece to form the secondary gas flow; and said passageway and said slots being spaced apart thereby causing the primary and secondary gas flows to issue at spaced apart locations.

12. A plasma arc torch for operating on a workpiece comprising:

a torch housing defining a chamber which has an outlet at an end of the housing;

means for supplying a gas to the chamber flowing towards said outlet, said gas being suitable for generating a plasma gas;

an electrode in the chamber near the outlet; and an annular gas distributor surrounding the electrode, said distributor being so shaped and so connected to electrode and housing that it defines an annular chamber between it and the electrode in communication with the outlet at one end and closed at the other end, said distributor further defining therein a plurality of channels substantially tangential to the annular chamber and connecting the chamber to the annular chamber so that gas from the gas supplying means will travel from the chamber to the annular chamber through said channels forming a primary gas flow and generating a vortex at said end of the electrode for directing the transferred arc from said end of the electrode to the workpiece through the outlet.

13. The torch of claim 1, wherein the electrode is elongated and has two substantially identical ends so that when one end is consumed, flipping over the electrode will allow the torch to operate with a transferred arc between the other end and the workpiece.

* * * * *

REEXAMINATION CERTIFICATE (1196th)

United States Patent [19]

[11] B1 4,581,516

Hatch et al.

[45] Certificate Issued Jan. 23, 1990

[54] PLASMA TORCH WITH COMMON GAS SOURCE FOR THE PLASMA AND FOR THE SECONDARY GAS FLOWS

[75] Inventors: Bruce O. Hatch; Richard A. Spaulding

[73] Assignee: Thermal Dynamics Corporation, West Lebanon, N.H.

Reexamination Request:
No. 90/001,665, Dec. 12, 1988

Reexamination Certificate for:

Patent No.: 4,581,516
Issued: Apr. 8, 1986
Appl. No.: 515,913
Filed: Jul. 20, 1983

[51] Int. Cl.$^4$ .................... B23K 9/00

[52] U.S. Cl. .................... 219/121.48; 219/121.5; 219/121.51; 219/75

[58] Field of Search .......... 219/121.48, 121.5, 121.51, 219/121.52, 121.49, 74, 75, 76.16, 121.36, 121.37; 313/231.21, 231.31, 231.41, 231.51; 315/111.21

[56] References Cited

U.S. PATENT DOCUMENTS

| | | | |
|---|---|---|---|
| 3,242,305 | 3/1966 | Kane et al. | 219/75 |
| 3,366,772 | 1/1968 | Wickham et al. | 219/121.48 |
| 4,024,373 | 5/1977 | Bykhovsky et al. | 219/75 |
| 4,361,748 | 11/1982 | Couch, Jr. | 219/121.51 |
| 4,421,970 | 12/1983 | Couch, Jr. | 219/121.51 |
| 4,521,666 | 6/1985 | Severance, Jr. et al. | 219/121.59 |

OTHER PUBLICATIONS

"High Quality Plasma Arc Cutting and Piercing", Skinner et al., *Welding Journal*, pp. 657–664, Aug. 1967.
"Applications of the Plasma Arc", by O'Brien.
"Interim Instructions for PLASMARC PT-2 Cutting Torch".
"Instructions for PT-30 Plasma Arc Cutting Torch", Jun. 1983.

*Primary Examiner*—M. H. Paschall

[57] ABSTRACT

In the plasma arc torch of this invention the same gas may be used for generating a plasma and for secondary gas flow for cooling the torch and the workpiece. A torch housing defines a chamber which has an outlet at the end of the housing. The torch also includes an electrode in the chamber near the outlet and means in the chamber for separating the gas flowing towards the outlet of the housing into a primary gas flow adjacent to the electrode for generating a plasma and a secondary gas flow away from the electrode for cooling the torch and the workpiece. In the preferred embodiment, air may be used for both the plasma forming gas and the secondary gas and the electrode has a halfnium insert. The torch has a torch tip adjacent to the electrode and the torch may be started without a pilot arc by touching the workpiece with the torch tip. No standoff between the electrode and the workpiece needs to be maintained and the torch operator simply drags the torch tip on the workpiece resulting in a more accurate cut or weld.

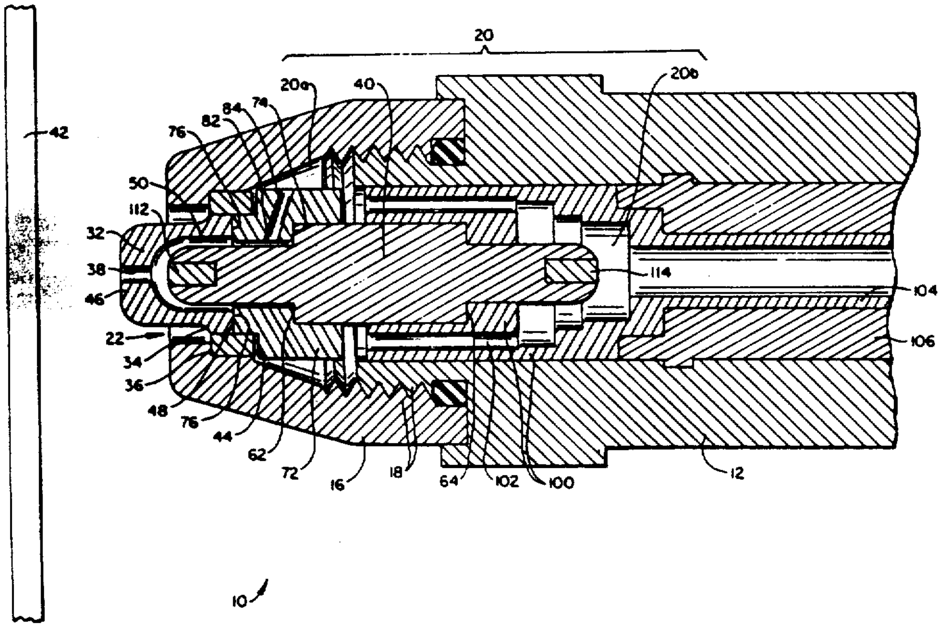

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4, 10, 11 and 13 is confirmed.

Claims 1, 2, 5, 7 and 12 are cancelled.

Claims 6 and 8 are determined to be patentable as amended.

Claim 9, dependent on an amended claim, is determined to be patentable.

'New claim 14 is added and determined to be patentable.

6. The torch of claim 5, wherein the electrode is elongated and has two ends, wherein the [halfnium] *hafnium* insert is located at one of the ends and wherein the electrode has a second spare [halfnium] *hafnium* insert at the other end, the two ends of the electrode and the two [halfnium] *hafnium* inserts being substantially identical so that when the insert at one end is consumed, flipping over the electrode with the other end facing the outlet will allow the torch to start and maintain a transferred arc between the [halfnium] *hafnium* insert at such other end and the workpiece for performing operations on the workpiece.

8. The plasma arc torch of claim 5, wherein said electrode is elongated, wherein said [halfnium] *hafnium* insert is at an end of the electrode facing the outlet, and wherein said gas separating means comprises:

a cup-shaped torch tip having a rim in the shape of an annular flange which is shaped to fit into the outlet thereby closing the outlet, wherein said torch tip surrounds said end of the electrode and defines a first annular chamber between it and the electrode for passage of the primary air flow, said tip further defining a passageway at the bottom of the cup-shaped tip for passage of a transferred arc and slots in its rim for passage of air from the housing chamber to the workpiece to form the secondary air flow; and an annular gas distributor surrounding the electrode, said distributor shaped and connected to the torch tip and the electrode in such manner so as to define a second annular chamber between it and the electrode that is in communication at one end with the first annular chamber and closed at the other end, said distributor further defining therein a plurality of channels that allow passage of air from the housing chamber to the second annular chamber and then to the first annular chamber, said channels being tangential to the second annular chamber so that the air passing therethrough will generate a vortex at the [halfnium] *hafnium* insert for directing the transferred arc from the insert to the workpiece through the passageway.

*14. A plasma arc torch for cutting a workpiece comprising:*

*a torch housing defining a housing chamber which has an outlet at an end of the housing;*

*means for supplying a gas to the housing chamber flowing towards said outlet, said gas being suitable for generating a plasma and for a secondary gas flow which will cool the torch and the workpiece;*

*an electrode in the housing chamber near the outlet; and* means in the housing chamber for separating said gas flowing towards the outlet of the housing into a primary gas flow adjacent to the electrode for generating a plasma and a secondary gas flow away from the electrode for cooling the torch and the workpiece, said primary and secondary gas flows being distinctly different gas flows that issue from the outlet at two locations spaced apart from each other, wherein said electrode is elongated with one end facing the outlet and wherein said gas separating means comprises:

*a cup-shaped torch tip having a rim in the shape of an annular flange which is shaped to fit into the outlet of the torch housing, said rim and the housing defining a passage for passageof gas from the housing chamber towards the workpiece to form the secondary gas flow, wherein said torch tip surrounds said end of the electrode to define there between a tip chamber, said tip further defining a passageway in the bottom of the cup-shaped tip for passage of a transferred arc, said passageway and said passage being spaced apart thereby causing the primary and secondary gas flows to issue at spaced apart locations; and*

*an annular gas distributor surrounding the electrode, said distributor being so shaped and so connected to the torch tip and electrode that it defines an annular chamber between it and the electrode in communication with the tip chamber, said distributor further defining therein a plurality of channels that are substantially tangential to the annular chamber and that connect the housing chamber to the annular chamber so that gas from the gas supplying means will travel from the housing chamber to the annular and tip chambers through said channels forming a primary gas flow and generating a vortex at said end of the electrode for directing the transferred arc from said end of the electrode to the workpiece through the passageway.*

* * * * *